United States Patent
Skupin et al.

(10) Patent No.: US 6,276,153 B1
(45) Date of Patent: Aug. 21, 2001

(54) METHOD AND DEVICE FOR HEATING AND COOLING A COMPARTMENT OF A MOTOR VEHICLE

(75) Inventors: Klaus Skupin, Notzingen; Roland Cäsar, Stuttgart; Jürgen Wertenbach, Fellbach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/278,000

(22) Filed: Mar. 29, 1999

(30) Foreign Application Priority Data

Mar. 27, 1998 (DE) .............................. 198 13 673

(51) Int. Cl.$^7$ .............................. F25B 27/00; F25B 13/00
(52) U.S. Cl. .............................. 62/204; 62/160; 62/238.7
(58) Field of Search .......................... 62/114, 160, 238.7, 62/502, 498, 204

(56) References Cited

U.S. PATENT DOCUMENTS

| | | | |
|---|---|---|---|
| 4,205,532 | * | 6/1980 | Brewan .............................. 62/114 X |
| 5,890,370 | * | 4/1999 | Sakakibara et al. . |
| 5,899,086 | * | 5/1999 | Noda et al. ..................... 62/238.7 X |

FOREIGN PATENT DOCUMENTS

| | | |
|---|---|---|
| 1 251 493 | 4/1968 | (DE) . |
| 3318025 | 11/1984 | (DE) . |
| 4432272 | 5/1997 | (DE) . |
| 0424474 | 8/1993 | (EP) . |

* cited by examiner

Primary Examiner—William Wayner
(74) Attorney, Agent, or Firm—Evenson, McKeown, Edwards & Lenahan, P.L.L.C.

(57) ABSTRACT

A method and a device for heating and cooling a compartment of a motor vehicle powered by an internal combustion engine are described. During a cooling operation, a medium in the circuit is guided through a compressor, an ambient heat exchanger, a throttle device, and an interior heat exchanger which are connected in series and form an integral closed circuit. On the high-pressure side of the circuit, a supercritical pressure is produced at the same time that a subcritical pressure is produced on the low-pressure side of the circuit. During a heating operation, the high-pressure side of the circuit during the cooling operation becomes the low-pressure side and the low-pressure side of the circuit during the cooling operation becomes the high-pressure side. The medium in the circuit is conducted in the interior heat exchanger at a supercritical pressure, with heat energy being transferred from the medium in the circuit to the compartment air supplied to the compartment. The medium in the circuit is additionally guided through an exhaust heat exchanger.

11 Claims, 1 Drawing Sheet

METHOD AND DEVICE FOR HEATING AND COOLING A COMPARTMENT OF A MOTOR VEHICLE

This application claims the priority of German patent application No. 198 13 673.0, filed Mar. 27, 1998, the disclosure of which is expressly incorporated by reference herein.

BACKGROUND AND SUMMARY OF THE INVENTION

The present invention relates to a particular method and a particular device for heating and cooling a compartment.

EP 0 424 474 B1 describes a method and a device for operating a transcritical vapor compression circuit. A compressor, a radiator, an expansion unit, and an evaporator are connected in series with one another by lines carrying coolant, and form an integral circuit for the coolant. In this circuit, the pressure on the high-pressure side is above the critical pressure of the coolant.

However, the method known from this publication has the disadvantage that the cooling power is controlled by changing the specific enthalpy of the coolant by varying the pressure and/or the temperature. Efficient power regulation with a supercritical process pressure is not feasible with the method and the device described in EP 0 424 474 B1, since environmental influences, such as outside temperature, humidity, solar radiation and so on, severely interfere with the control of the cooling power by differences in enthalpy of different degrees in the evaporator. A considerable regulation expense is required for regulating power in this way.

DE 44 32 272 C2 describes a method for operating a cold-generating system for air-conditioning vehicles. The cold-generating system comprises, as circuit components, a compressor, a heat exchanger, an expansion unit, and an evaporator, which are connected in series and form an integral closed circuit for the coolant. To produce cooling power, the circuit is operated on the high-pressure side at a supercritical pressure and, simultaneously, on the low-pressure side at a subcritical processing pressure. Heat energy is supplied to the coolant on the high-pressure side. The mass flow of the coolant in the circuit is varied by regulating the throughput of the coolant in the compressor.

The disadvantage of this method is that the compartment of a vehicle can be air-conditioned only under certain conditions since the compartment air flow supplied to the compartment can essentially only have energy withdrawn from it. Only cooling of the compartment is possible with this cold-generating system.

Hence, one object of the present invention is to expand a coolant circuit that essentially operates transcritically for air conditioning vehicles in such a fashion that the heating power transferred to the compartment air is provided efficiently, comfortably, and at a certain temperature level. Additionally, it is an object of the invention to provide a modern vehicle concept for air conditioning an interior of a motor vehicle which provides required cooling or heating power nearly independently of the operating state of the internal combustion engine and of influences in the environment such as the outside temperature, humidity, solar radiation, etc.

This object is achieved according to the invention, during a cooling operation, by conducting a medium in the circuit through a compressor, an ambient heat exchanger, a throttle device, and an interior heat exchanger, which are connected in series and form an integral closed circuit. A supercritical pressure is produced on a high-pressure side of the circuit and, at the same time, a subcritical pressure is produced on the low-pressure side of the circuit. On the low-pressure side of the circuit, heat is supplied to the medium in the circuit through the interior heat exchanger. The mass flow of the medium in the circuit is varied by regulating the throughput of the medium in the circuit in the compressor.

During a heating operation, the medium in the circuit is conducted sequentially through the compressor, the interior heat exchanger, the throttle device, the ambient heat exchanger, and/or an exhaust heat exchanger. Consequently, the high-pressure side of the circuit during the cooling operation becomes the low-pressure side and the low-pressure side of the circuit during the cooling operation becomes the high-pressure side. The medium in the circuit is guided in the interior heat exchanger at a supercritical pressure, and heat from the medium in the circuit is transferred to the compartment air being supplied to the compartment. The mass flow of the medium in the circuit is regulated by regulating the throughput of the medium in the circuit in the compressor. Additionally, the pressure in the interior heat exchanger is regulated to a value below an admissible pressure.

A particular device according to the invention operates such that, during the heating operation, the compressor, the interior heat exchanger, the throttle device, the ambient heat exchanger, and the exhaust heat exchanger are connected in series and a medium in the circuit can be expanded in the throttle device to a temperature below an intake temperature of the medium in the circuit in the compressor. The medium can be exposed to ambient air in the ambient heat exchanger, heated in the exhaust heat exchanger by exhaust from the engine, and compressed in the compressor. During the cooling operation, the compressor, the ambient heat exchanger, the throttle device, and the interior heat exchanger are arranged in series, and the medium in the circuit may be exposed to ambient air in the ambient heat exchanger and expanded in the throttle device to a temperature below a compartment air temperature. The compartment air can be exposed to the medium in the circuit in the interior heat exchanger.

With the method according to the invention, the mass flow of medium in the circuit is varied as required in an advantageous fashion as a function of the required heating power and the quantity of heat supplied from the environment and/or the exhaust heat from the engine. As a result, air conditioning permanently installed according to the prior art for cooling can be used in a simple fashion for heating the interior of the motor vehicle.

It is also advantageous that only that compressor power that is absolutely necessary for comfortable heating is drawn and the temperature of a medium in the circuit is maintained in the interior heat exchanger at a temperature level such that a suitable temperature of the compartment air is ensured for safe operation of the motor vehicle in traffic.

In an advantageous fashion, when the device according to the invention is used for heating a compartment of a motor vehicle, the medium in the circuit is successively expanded in the throttle device to a subcritical process pressure, heated in the ambient heat exchanger and/or the exhaust heat exchanger, compressed in the compressor to a supercritical process pressure, and cooled in the interior heat exchanger with cold compartment air, so that the compartment can be heated with the heated compartment air.

Another advantage of operating the circuit under subcritical process conditions is that no phase change of a circulating medium takes place in the interior heat exchanger. Instead, the circulating medium is permanently conducted in the subcritical range through the interior heat exchanger and, therefore, a much higher quantity of heat can be transferred from the circulating medium to the compartment air. A much higher efficiency is achieved in the circulating process than in conventional circulating processes that operate in the subcritical range.

By regulating or controlling the throughput of the compressor in combination with the heat uptake by the ambient heat exchanger, it is possible to react flexibly and rapidly to desired temperature changes in the compartment air in the compartment or to compensate flexibly and rapidly for influences such as intense solar radiation.

It is especially advantageous in a supercritical process that a much higher quantity of heat can be transferred from the circulating medium to the compartment air supplied to the compartment with known heat exchangers, since the circulating medium is conducted at a much higher temperature through the interior heat exchanger. This ensures that components already present and known from the prior art can be used without any design changes.

The arrangement of the components according to the invention makes possible a thermodynamic circulating process in which the heating power can be provided to a sufficient degree in a simple manner under nearly all operating states of the internal combustion engine.

In addition, the supplementary vehicle heating that is provided routinely can be eliminated, thus resulting in weight production and hence a reduction of fuel consumption by the motor vehicle in an advantageous manner.

BRIEF DESCRIPTION OF THE DRAWINGS

Advantageous improvements and designs of the invention are reflected in the claims and will become clear from the embodiment described below with reference to the drawings.

DESCRIPTION OF THE PREFERRED EMBODIMENTS

Figure 1:
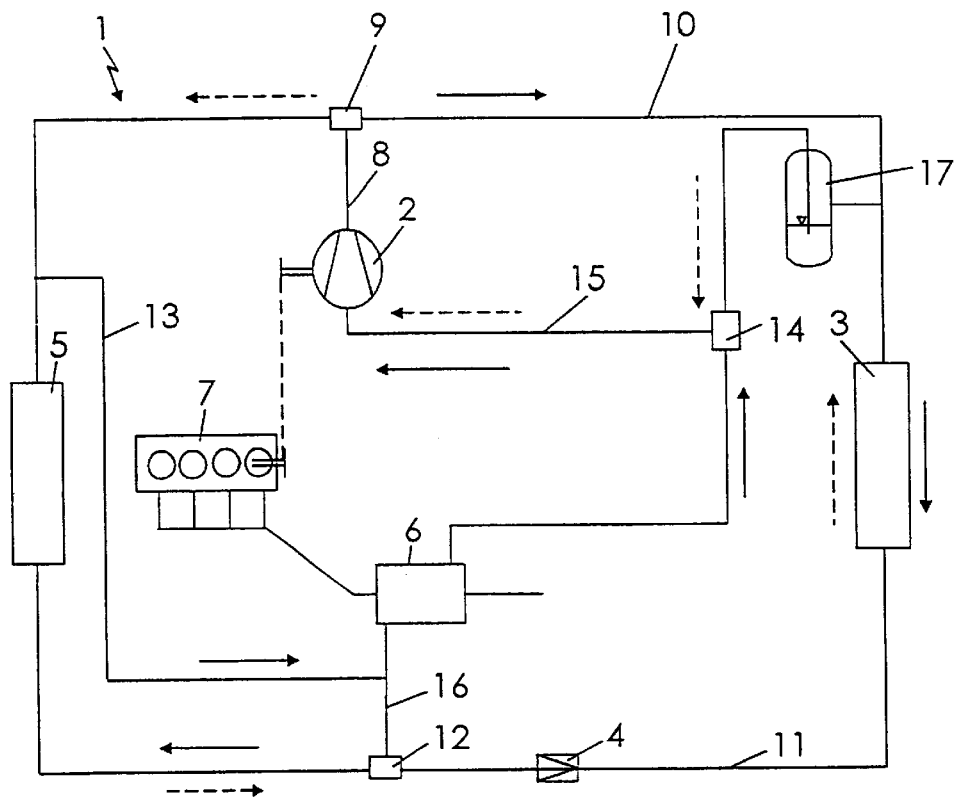
FIG. 1 is a schematic view of a device for heating and cooling a compartment of the motor vehicle.

FIG. 1 is a schematic view of a vapor compression circuit or a circuit 1 that can be operated under transcritical process conditions. The circuit has, connected successively in series, a compressor 2, an interior heat exchanger 3, a throttle device 4, an ambient heat exchanger 5, and an exhaust heat exchanger 6 designed as a countercurrent heat exchanger as circuit components.

Circuit 1 can be used for both heating and cooling a compartment of a motor vehicle with an internal combustion engine 7. In this circuit, the solid arrows indicate the flow direction of the circulating medium during a heating operation and the dashed arrows indicate the flow direction during a cooling operation. The medium in the circuit is compressed to a supercritical process pressure by the compressor 2 driven by an engine 7 and enters a line 8 connected to a 3/2-way valve that is used as a mode switch 9 for a cooling or heating operation of circuit 1. In addition, a collecting container 17 is provided in the circuit 1 on the intake side of the compressor 2 to collect surplus medium in the circuit as a circuit component in the circuit 1.

During the heating operation, the medium in the circuit is conducted from the mode switch 1 through a line 10 to the interior heat exchanger 3 which is located on the high-pressure side of the circuit 1. There, the medium in the circuit is exposed to compartment air which is supplied to the compartment, with the compartment air being heated by the medium in the circuit. The medium in the circuit passes through a line 11 to the throttle device that is designed as an expansion valve 4 and flows from there through the 3/2-way valve 12 to the ambient heat exchanger 5 where it is exposed to ambient air. In expansion valve 4, the medium in the circuit is expanded to a subcritical process pressure so that all of the circuit components between the expansion valve 4 and the compressor are on a low-pressure side of the circuit 1 during the heating operation.

The medium in the circuit is then conducted through a line 13 to the exhaust heat exchanger 6 and heated by the hot exhaust gases from internal combustion engine 7. Then, the medium in the circuit flows through a circuit valve 14 and a line 15 to the compressor 2, completing the circuit 1.

If the temperature of the medium in the circuit during the heating operation downstream from expansion valve 4 is above the ambient temperature or if there is a danger of icing in heat exchanger 5, then a bypass line 16 is opened by the 3/2-way valve 12. The line 13 is closed at the same time. In this position of the 3/2-way valve 12, the ambient heat exchanger 5 no longer has the medium in the circuit flowing through it.

Because the ambient heat exchanger 5 no longer has the medium in the circuit flowing through it, icing of the ambient heat exchanger 5 is avoided in a simple fashion. Moreover, no heat energy is removed by the cooler ambient air from the medium in the circuit. The medium in the circuit, therefore, enters the exhaust heat exchanger 6 at a higher temperature than would be the case after giving up heat energy to the environment.

This is important shortly after the motor vehicle is started, since the exhaust temperature is low during this operating phase and so only a small amount of heat is available for heating the medium in the circuit in exhaust line exchanger 6.

During the cooling operation, the medium in the circuit is guided through the compressor 2, the ambient heat exchanger 5, the expansion valve 4, and the interior heat exchanger 3. The compressor 2, the ambient heat exchanger 5, the expansion valve 4, and the interior heat exchanger 3 are connected in series and form an integral closed circuit 1. A supercritical pressure is produced on the high-pressure side of the circuit 1 and a subcritical pressure is produced on the low-pressure side of circuit 1. Heat energy is supplied on the low-pressure side to the medium in the circuit in the interior heat exchanger 3.

The mass flow of the medium in the circuit is varied in the circuit 1 by regulating the throughput of the medium in the circuit in compressor 2. For the heating operation, the high-pressure side of circuit 1 is connected during the cooling operation to the low-pressure side. Also, the low-pressure side of the circuit 1 is connected to the high-pressure side during the cooling operation. The medium in the circuit, therefore, is guided during heating at a subcritical pressure in the interior heat exchanger 3, thereby transferring heat energy to the compartment air being supplied to the compartment. In order to increase the quantity of heat that can be transferred, the medium in the circuit is additionally guided through exhaust heat exchanger 6. Just as in the cooling operation, the mass flow of the medium in the circuit is adjusted in the circuit 1 during the heating operation by regulating the throughput of the compressor 2.

Parameters such as a specific temperature of the compartment or a required heating or cooling power serve as regulating parameters.

Figure 2:
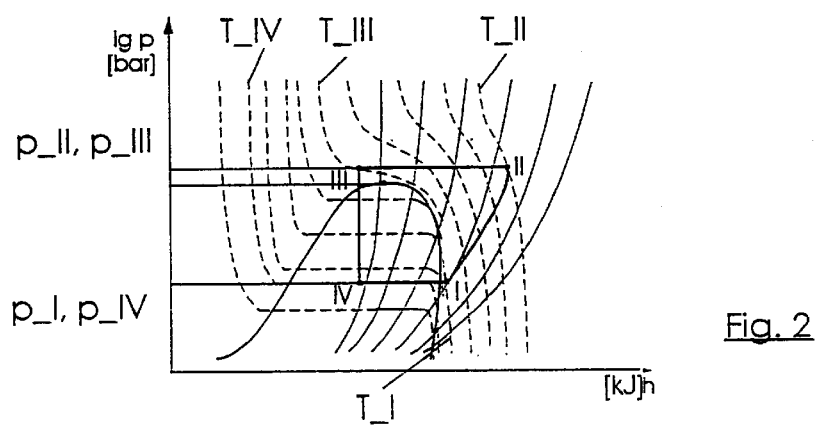
FIG. 2 is an enthalpy-pressure graph of a vapor compression circuit operated under transcritical process conditions.

FIG. 2 shows an enthalpy-pressure graph of circuit 1 during a heating operation according to FIG. 1. During compression of the medium in the circuit in compressor 2, the pressure in circuit 1 is raised from a starting pressure P-I to a supercritical pressure P-II. The temperature of the medium in the circuit rises from a temperature T-I to a temperature T-II. The compressed medium in the circuit is then cooled in the interior heat exchanger 3 by the compartment air flow supplied to the compartment isobarically to a temperature T-III. The process pressure of the medium in the circuit, as it flows through expansion valve 4, is then lowered isenthalpically to a subcritical pressure P-IV that corresponds to the starting pressure P-I. The medium in the circuit then cools to a temperature T-IV that is in the wet-vapor range of the medium in the circuit. Then, the medium in the circuit, as a two-phase mixture, enters the ambient heat exchanger 5 and/or the exhaust heat exchanger 6. The mixture is heated there by the ambient air and/or the exhaust gases from engine 7 so that the liquid portion of the medium in the circuit evaporates.

The heating power delivered by compressor 2 to circuit 1 is calculated from the product of the mass flow of the medium in the circuit and the difference in enthalpy of process states I and II. The product of the difference between the specific enthalpies of the medium in the circuit in process states IV and I and the mass flow of the medium in the circuit produces the heating power absorbed at a low temperature level in ambient heat exchanger 5. The quantity of heat transferred to the compartment air in the interior heat exchanger 3 during the heating operation is the product of the difference in enthalpy between the state points II and III in FIG. 2 and the mass flow of the medium in the circuit. The value of the specific enthalpy of the medium in the circuit at state point III corresponds to the compression work supplied to the medium in the circuit and the increase in enthalpy by the heat added during evaporation in ambient heat exchanger 5 and/or exhaust heat exchanger 6.

A value that describes the efficiency of thermodynamic circuit processes is the "coefficient of performance" COP, which is defined as the ratio between the useful power (cooling or heating power) and the compressor driving power that is used. The higher the useful power and the lower the driving power used for compressor 2, the higher the COP.

If a constant useful power is desired, then the driving power of compressor 2 with increasing heat supply can be reduced by the medium in the coolant in interior heat exchanger 3. If on the other hand the quantity of heat that can be transferred in interior heat exchanger 3 decreases, then a higher power is supplied by regulation (not shown) to the compressor 2 so that the desired heating power is available.

With constant suction pressure and high pressure in compressor 2, the driving power of compressor 2 depends on the mass flow of the medium in the circuit. With low cooling and heating power, the required mass flow of medium in circuit 1 is small and, with a required high cooling or heating power, the corresponding mass flow of this medium in the circuit is large. In this way, the throughput of medium in the circuit through compressor 2 and the mass flow circulating in the circuit 1 can be adapted to the requirement for heat and the supply of low temperature heat in the same way.

In a design of the circuit 1 that differs from the present embodiment, a form of regulation that is not shown is provided for adjusting a certain pressure level in circuit 1. This regulation regulates expansion valve 4 and compressor 2. The opening cross section of the expansion valve 4 in the simplest form of regulation can be designed to open wider as the mass flow of the medium in the circuit delivered by compressor 2 increases. An adjusting device can be provided for controlling the compression stroke to vary the throughput of the compressor 2.

Test series have shown that carbon dioxide ($CO_2$) is especially suitable as a medium for the circuit in order to operate the present circuit 1 with a good degree of efficiency. Because of the high volumetric cooling power of carbon dioxide, a smaller volume flow of the medium in the circuit is required in circuit 1 and the cross sections of lines 8, 10, 11, 13, 15, and 16 are much smaller than when using conventional coolants. In addition, because of the lower viscosity and low flow rates in lines 8, 10, 11, 13, 15, and 16, relatively long lines, especially suction lines, can be traversed with almost no decrease in pressure.

On entering the interior heat exchanger 3, the two-phase medium in the circuit, during cooling operation of circuit 1, is divided into various lines connected in parallel (not shown) of interior heat exchanger 3. This ensures that in each parallel line, only that amount of medium in the circuit will be introduced that can also evaporate. The medium is distributed in the circuit differently in the evaporators and heat exchangers known from the prior art, with many known solutions using the basic principle that the medium in the system, after distribution into the narrower lines and capillaries, is injected into very much larger line cross sections. Because of the sudden expansion of the cross section of the line, the medium in the circuit comes loose at the expanded point from the walls of the line and then evaporates as a result of the sudden expansion.

During operation of circuit 1 as a heat pump or during the heating operation, the flow direction of the medium in the circuit in the ambient heat exchanger 5 and in the interior heat exchanger 3 is reversed. The reversal causes a sudden reduction of cross section and/or a sharp reduction in the flow of the medium in the system in interior heat exchanger 3, which can result in considerable pressure drops and a reduction of the COP.

Thus, it is advantageous to use a medium in the circuit such as carbon dioxide for example which, as mentioned above, possesses a high volumetric cooling power in order to reduce the pressure losses. In order to transport the same quantity of heat using a medium in the circuit with a low volumetric cooling power, a much larger volume flow of the medium in the circuit is required which in turn causes a necessary increase in the frictional losses in the lines 8, 10, 11, 13, 15, 16 conducting the medium in the circuit and in the pressure losses in the internal heat exchanger 3.

When $CO_2$ is used as the medium in the circuit, because of the lower viscosity of $CO_2$ and the low flow rates that result from the low volume flows in the lines, even relatively long lines, especially suction lines, can have the medium flow through them with practically no decrease in pressure.

Another advantage of $CO_2$ is that it is inert even at high process temperatures. This means that, in the presence of carbon dioxide, irreversible changes caused by overheating can occur only at high temperatures at admixtures in circuit 1. In addition, $CO_2$ is a nonpoisonous, environmentally friendly, and nonflammable material that can be used in a motor vehicle without any safety problems.

By comparison with a reference cooling circuit in heating circuits that are operated with a fluorine-hydrocarbon (R134a) as a medium in the circuit, the transcritical cooling circuit with $CO_2$ shows the same or better performance figures in a technically feasible temperature range of the heat source. The difference becomes even more pronounced as the temperature during heat uptake becomes lower. This is essentially based on the higher pressure ratio of the reference process which includes a lesser isentropic compressor efficiency.

Transcritical cooling circuits are very good systems for applications in which a high temperature spread for giving off heat is advantageous and a heat source with nearly constant temperature is available. This is the case in a motor vehicle with the air flow to be heated for the vehicle interior and an uptake of heat from the environment and/or the exhaust.

For safe operation of the motor vehicle in traffic, the windshield must be kept free of precipitation and deiced if necessary. For this purpose, an air flow is directed at the windshield that has a temperature that is preferably higher than 30° C.

One criterion for comfortable heating of the compartment is that it can be traversed by an average throughput of compartment air through the compartment or the cabin. In order for the required heating power to be transmitted, the air stream of the compartment air must have a high temperature. Thus, the temperature of the medium in the circuit when heat is released in the interior heat exchanger 3 determines the degree of comfort that can be achieved in the compartment of the vehicle. The temperature of the medium in the circuit at the inlet and outlet of the interior heat exchanger 3 designed as a cross-current heat exchanger should be at least 20° C. above the desired temperature of the compartment. In order to achieve this setting, it is advantageous to keep the medium in the circuit supercritical when heat is given off to the interior heat exchanger 3.

The pressure in the interior heat exchanger 3, however, must not exceed the admissible pressure for safety reasons. It is important to note that the circuit 1 and the components of the circuit, even when the motor vehicle is at rest, can be heated by solar radiation, heat radiated from hot engine parts, manufacturing processes when repainting the vehicle, etc., so that the medium in the circuit in the system is evaporated and expands isochorically. Depending on the volume of the circuit 1, with a part temperature of 80 to 90° C., a resting pressure increase of 80–90 bars can be expected in circuit 1. All of the components of the circuit of the device that can be operated transcritically, especially the interior heat exchanger 3, must be able to safely rise to a pressure of 90 bars, keeping in mind suitable safety margins.

A pressure-resistant design for the components is a critical factor for the weight of the components since a high process pressure requires, as a design measure in its simplest form, thicker walls that result in a higher weight of the device.

Therefore, it is advantageous for reasons related to weakness to limit the maximum admissible process pressure in circuit 1 to a value that corresponds to the maximum resting pressure that develops in the cooling circuit of the vehicle.

The materials from which the channels that conduct the compartment air (not shown) are made in the prior art are limited in their temperature resistance. Thus, the material strength, for example in PP materials, decreases rapidly above 100° C. The tensile strength of the aluminum materials used to make interior heat exchanger 4 and lines 8, 10, 11, 13, 15 and 16 drops clearly when the temperature increases from 20° C. to 100° C. Temperatures that increase further result in a disproportionate decrease in strength. In order to be able to use materials that are economical and can be recycled, limiting the upper compression temperature of the medium in the circuit is advantageous. Thus a thermal overload on the air guide channels as well as the use of temperature-resistant cost-intensive materials can be avoided. Moreover, an upper temperature of the compartment air conducted into the compartment of the motor vehicle should not exceed 80° C., since higher air temperatures are quickly perceived as painful by the vehicle occupants.

The throughput of the compartment air flow conducted through the interior heat exchanger 3, in an additional embodiment of the present invention not shown in greater detail, can be adjusted in the interior heat exchanger 3 so that the pressure on the high-pressure side of the circuit 1 is regulated to a fixed pressure during a heating operation. The throughput of the compartment air can be adjusted in a simple fashion by varying the air throughput in the interior heat exchanger or using a blower, known from the prior art, on the ventilating device of the motor vehicle. Another possibility for regulating the throughput of the compartment air involves using adjustable air flaps in the channels of the ventilating device that conduct the compartment air.

With these measures, the medium in the circuit is not subjected to any phase change in the interior heat exchanger 4 and the process pressure does not fall below a supercritical pressure so that the advantages of the supercritical process described above can be enjoyed.

Figure 3:
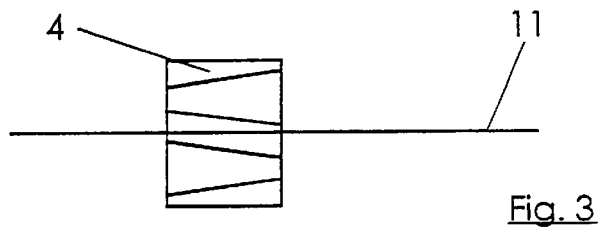
FIG. 3 is a view of a combination expansion valve design.

Expansion valve 4, as shown schematically in FIG. 3, can be designed in an advantageous embodiment as a combination expansion valve in the form of a three-dimensional unit. This design can be switched in both flow directions for expansion of the medium in the circuit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for heating or cooling a compartment of a motor vehicle powered by an internal combustion engine comprising the steps of:
    a) conducting a medium through an integral closed circuit including a compressor, an ambient heat exchanger, a throttle device, and an interior heat exchanger,
    b) producing a supercritical pressure on a high-pressure side of the circuit and, at the same time, a subcritical pressure on a low-pressure side of the circuit,
    c) cooling said compartment by (1) supplying heat to the medium in the circuit through the interior heat exchanger, (2) varying a mass flow of the medium through the circuit by regulating throughput of the compressor, and (3) conducting the medium sequentially through the compressor, the ambient heat exchanger, the throttle device, and the interior heat exchanger so that the interior heat exchanger is on a low-pressure side of the circuit during a cooling operation, and
    d) heating said compartment by (1) supplying heat from the medium in the circuit through the interior heat exchanger at a supercritical pressure and transferring the heat from the medium to compartment air supplied to the compartment, (2) varying a mass flow of the medium through the circuit by regulating the throughput of the compressor, and (3) conducting the medium sequentially through the compressor, the interior heat exchanger, the throttle device, and at least one of the ambient heat exchanger and an exhaust heat exchanger disposed between the ambient heat exchanger and the compressor so that the interior heat exchanger is on a high-pressure side of the circuit while heating said compartment, and (4) regulating pressure in the interior heat exchanger to a value below an admissible pressure, during a heating operation.

2. Method according to claim 1, wherein the mass flow of the medium through said integral closed circuit is additionally regulated by said throttle device.

3. Method according to claim 2, wherein said throttle device can be switched to regulate the throughput of the medium in the circuit.

4. Method according to claim 2, wherein the throughput of the compressor is regulated as a function of a specified temperature of the compartment of the motor vehicle.

5. Method according to claim 4, wherein the throughput of the compressor is regulated as a function of a specified heating power.

6. Method according to claim 1, wherein said throttle device can be switched to regulate the throughput of the medium in the circuit.

7. Method according to claim 1, wherein the throughput of the compressor is regulated as a function of a specified temperature of the compartment of the motor vehicle.

8. Method according to claim 7, wherein the throughput of the compressor is regulated as a function of a specified heating power.

9. Method according to claim 1, wherein the compressor is driven by the engine of the motor vehicle.

10. Method according to claim 1, wherein said medium is an environmentally friendly, nonflammable, nonpoisonous coolant that operates during vehicle operation under transcritical state conditions.

11. Method according to claim 10, wherein said coolant is $CO_2$.

* * * * *